B. P. JOYCE

PACKING RING

May 29, 1928.

Re. 16,978

Original Filed April 26, 1924 2 Sheets-Sheet 1

INVENTOR
B. P. Joyce
BY W. N. Roach
ATTORNEY

B. P. JOYCE

PACKING RING

May 29, 1928.

Original Filed April 26, 1924

Re. 16,978

2 Sheets-Sheet 2

INVENTOR
B. P. Joyce.

BY W. M. Road.
ATTORNEY

Reissued May 29, 1928. Re. 16,978

UNITED STATES PATENT OFFICE.

BRYAN P. JOYCE, OF DAVENPORT, IOWA.

PACKING RING.

Original No. 1,583,931, dated May 11, 1926, Serial No. 709,236, filed April 26, 1924. Reissue No. 16,725, dated August 30, 1927, Serial No. 205,813, filed July 14, 1927. This application for reissue filed November 3, 1927. Serial No. 230,894.

My invention has reference, in general terms, to packing rings, and in the attached illustration it is shown as more particularly relating to a U-shaped packing ring as applied to a floating or free piston in hydro-pneumatic recuperator mechanisms for gun carriages, though it will be understood that within the general statement above it is not limited to the structure or use illustrated.

The principal object of my invention is to provide a facing of soft metal in a packing ring which will reduce the contact area of the harder metal of which the packing ring is composed. The packing ring herein referred to is made of coin silver, but when the contact surface is composed entirely of this metal, the bore of the steel cylinder becomes scored. Accordingly, I provide a facing material of tin or some other soft metal, which not only polishes the steel surface with which it is in moving contact, but also offers sufficient resistance so that the coin silver of the packing ring which engages the cylinder will not score or mar the polished steel surface of the bore. It is essential that the contacting surface of the coin silver be reduced to a minimum.

Another object of my invention is to position the packing rings in a novel and unique manner to secure an increased area for the action of a lubricant.

To these and other ends, my invention consists in the construction, arrangement and combination of parts, described hereinafter and pointed out in the claims forming a part of this specification.

One embodiment of my invention is illustrated by way of example in the accompanying drawings in which, Fig. 1 is a longitudinal section of a floating or free piston; a fragment of the cylinder being shown;

Figure 1:
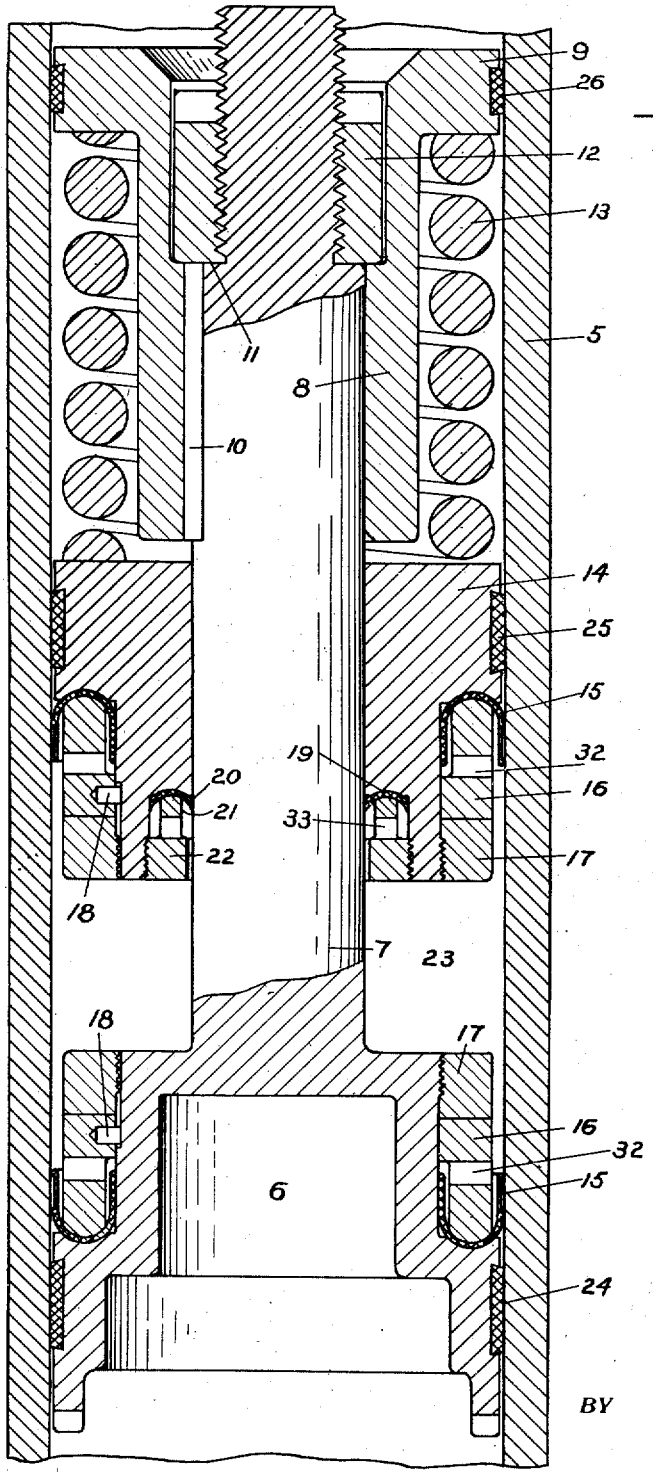
Figure 2:
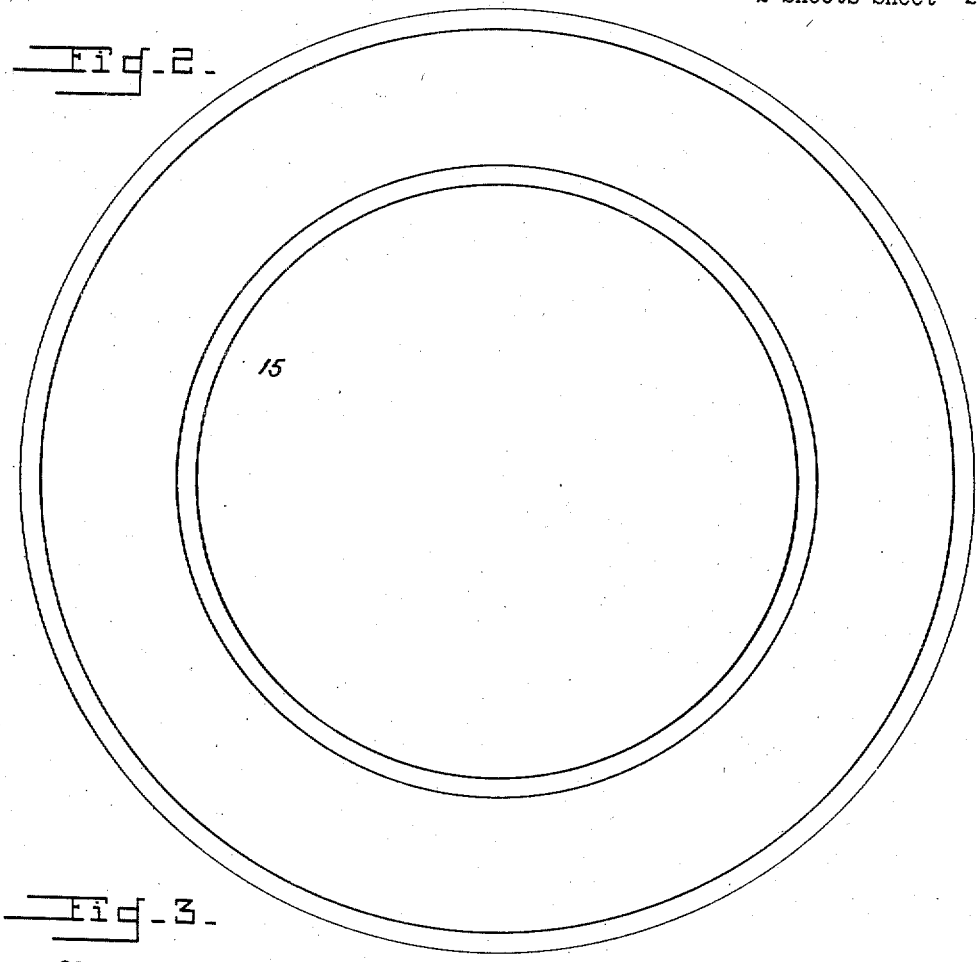
Fig. 2 is a plan view on an enlarged scale of the packing ring.
Figure 3:
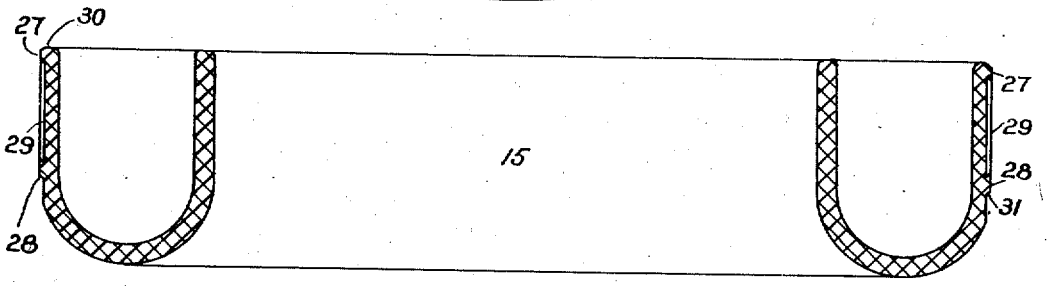
Fig. 3 is a sectional view on an enlarged scale of the packing ring.

In the drawings wherein like characters of reference designate like or similar parts, 5 indicates a cylinder enclosing a floating piston comprising a piston head 6 and a stem 7. A follower 8 formed with an annular flange 9 embraces the terminal portion of the stem 7 and is held against rotation by means of a key 10. The follower 8 is further formed with an annular shoulder 11 to seat a nut 12 threaded on the reduced terminus of the piston stem 7, and adapted to regulate the tension of a coil spring 13.

Embracing the follower 8 and seated in the annular flange 9 is the coil spring 13, which engages a packing ring 14. The packing ring 14 embraces the piston stem 7 and is positioned between the follower 8 and the piston head 6. It is reduced to seat a cup ring 15 which is securely held in place by a compression ring 16 and a ring nut 17, which are spaced from the cylinder 5 for a purpose which will hereinafter appear. A stop pin 18 carried by the compression ring 16 engages the packing ring 14 and prevents relative rotation of these two rings.

The inner periphery of the reduced portion of the packing ring 14 is formed with an annular shoulder 19 adapted to seat a packing ring 20, which may be similar in construction to the cup ring 15 and which is retained in position by a compression ring 21 and a plug 22 spaced from the piston stem 7 and engageable with the packing ring 14. When one of the cup rings 15 is substituted for the packing ring 20, it will be understood that the tin or soft metal hereinafter described will be on its inner shell or contact portion, that is to say, its friction surface.

The piston head 6 includes the same structure of cup ring 15, compression ring 16 and ring nut 17 as described in connection with the packing ring 14.

The chamber 23, formed between the piston head 6 and the packing ring 14, contains a lubricant which is maintained under pressure, by means of the coil spring 13 acting on the packing ring 14, thereby preventing a mixture of the fluids contained in the cylinder at either end of the floating piston.

Anti-frictional metal rings 24, 25 and 26 are positioned respectively on the piston head 6, packing ring 14, and follower 8 for an obvious purpose.

The cup rings 15, preferably composed of coin silver, have their friction surface or contacting portion formed with peripheral flanges 27 and 28 constituting an annular dove-tailed groove for the reception of a band 29 of tin or other soft metal. The peripheral flanges are reduced in width by cutting away a portion thereof as at 30 and 31 so that the the smallest practicable area of hard metal will engage the polished bore of the cylinder 5.

By spacing the compression rings 16 and 21 and their retaining means 17 and 22 from the cylinder bore and the piston stem, respectively, I attain an increased area for the action of the lubricant which is under pressure.

Vents 32 and 33 may be formed in the compression rings 16 and 21 to permit the influx of lubricant to the spaces between the compression rings and the packing ring to flex and press the latter against the opposed friction surface of the cylinder or rod and thus effectually seal the same from the lighter fluids at either end of the floating piston.

While in the foregoing, there has been illustrated and described such combination and arrangement of elements as constitute the preferred embodiment of my invention, it is nevertheless desired to emphasize the fact that interpretation of the invention should only be conclusive when made in the light of the subjoined claims.

Having thus described my invention, I claim:

1. In combination with a cylinder and a floating piston, the piston head being reduced to form an annular seat, a packing ring embracing the piston stem and formed with annular seats on its inner and outer periphery, a cup ring disposed in each of the annular seats, reduced peripheral flanges formed on the contact portion of the cylinder engaging cup rings, a relatively wide tin band disposed between the flanges and flush therewith, compression rings mounted within the cup rings and spaced from the sides thereof, said compression rings being formed with vents, means for preventing rotation of the compression rings, and means spaced from the cylinder and piston stem for retaining the compression rings in fixed position.

2. In combination with a cylinder and a piston including a stem and a head, a packing ring embracing the piston stem, said piston head and packing ring being formed with annular seats, a cup ring disposed in each of the annular seats, reduced peripheral flanges formed on the cylinder engaging portion of the cup rings, a relatively wide tin band disposed between the flanges and flush therewith, compression rings mounted within the cup rings and spaced from the sides thereof, said compression rings being formed with vents, means for preventing rotation of the compression rings, and means spaced from the cylinder for retaining the compression rings in fixed position.

3. In combination with a cylinder and a floating piston, the piston head being reduced to form an annular seat, a packing ring embracing the piston stem and formed with annular seats in its inner and outer periphery, a cup ring disposed in each of the annular seats, compression rings mounted within the cup rings, said compression rings being provided with vents, means for preventing rotation of the outer compression rings, and means spaced from the cylinder and piston stem for retaining the compression rings in fixed position.

4. In combination with a cylinder and a piston, a packing ring embracing the piston stem, said packing ring being formed with annular seats on its inner and outer periphery, a cup ring disposed in each of the annular seats, reduced peripheral flanges formed on the contact side of the cylinder engaging cup ring, a band of a relatively soft metal disposed between the flanges, and means spaced from the sides of the cup rings for retaining the same in fixed position.

5. In combination with a cylinder and a piston, a packing ring embracing the piston stem, said packing ring being formed with an annular seat, a cup ring disposed in the annular seat, peripheral flanges formed on the outer shell of the cup ring, a band of relatively soft metal disposed between the flanges and flush therewith, and means spaced from the inner and outer shells of the cup ring and from the cylinder for retaining said cup ring in fixed position.

6. In combination with a cylinder and a floating piston, a packing ring embracing the piston stem, said packing ring being formed with an annular seat, a cup ring disposed in the annular seat, and means spaced from the inner and outer shells of the cup ring and from the cylinder for retaining said cup ring in fixed position.

7. The combination with a cylinder, of a movable member carried within the cylinder, a cup ring embracing the movable member, and means spaced from the shells of the cup ring and the cylinder and carried by the movable member for retaining said cup ring in fixed position, said retaining means being provided with vents for permitting access of a fluid to the inner shell.

8. The combination with a cylinder, of a movable member carried within the cylinder, a cup ring embracing the movable member, peripheral flanges formed on one shell of the cup ring, a band of relatively soft metal disposed between the flanges, and means for retaining the cup ring in fixed position.

9. A substantially U-shaped packing ring having peripheral flanges formed on one of its shells, said flanges reduced in width by cutting away a portion thereof, and a relatively wide tin band disposed between the flanges and flush therewith.

10. A packing ring having an unbroken annular portion forming a friction contact surface and being thin enough to flex under pressure, said portion having peripheral flanges reduced in width by cutting away a portion thereof, and a relatively wide soft metal band disposed between the flanges and flush therewith.

11. In a packing between relatively movable parts of a machine, the combination of a plurality of continuous, all-metal, readily-flexible packing rings in sealing contact with said parts, said packing rings and said parts enclosing a lubricant under pressure which maintains the packing rings in sealing contact, and resilient means to maintain the lubricant under pressure.

12. In a packing between relatively movable parts of a machine, the combination of a plurality of continuous, all metal, readily-flexible packing rings in frictional sealing contact with said parts, said packing rings and said parts enclosing a lubricant under pressure which maintains the packing rings in sealing contact, one of the frictional sealing surfaces being of hard polished metal and the other largely of tin, and means to maintain the lubricant under pressure.

13. The combination with a cylinder, of a movable member mounted within the cylinder, an all-metal packing ring embracing the movable member, said packing ring having an unbroken annular portion forming a sealing friction surface and being thin enough to flex under pressure, peripheral flanges formed on said annular portion, a band of tin disposed between the flanges, and means for retaining the packing ring in fixed position.

In testimony whereof, I have hereunto affixed my signature.

BRYAN P. JOYCE.